United States Patent
Huang

(10) Patent No.: US 9,749,803 B2
(45) Date of Patent: Aug. 29, 2017

(54) PATH DETERMINATION BASED ON APPLICATION USAGE

(71) Applicant: Apple Inc., Cupertino, CA (US)

(72) Inventor: Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 94 days.

(21) Appl. No.: 14/023,406

(22) Filed: Sep. 10, 2013

(65) Prior Publication Data

US 2015/0072712 A1    Mar. 12, 2015

(51) Int. Cl.
*H04W 24/00* (2009.01)
*H04W 4/02* (2009.01)

(52) U.S. Cl.
CPC .......... *H04W 4/028* (2013.01); *H04W 4/027* (2013.01)

(58) Field of Classification Search
CPC ....... H04W 4/028; H04W 4/027; H04W 4/02; H04Q 7/20; G08G 1/01
USPC ........................ 455/456.3, 414.2, 456.1, 457
See application file for complete search history.

(56) References Cited

U.S. PATENT DOCUMENTS

| | | | |
|---|---|---|---|
| 8,972,770 B1 | 3/2015 | Odean et al. | |
| 2002/0188424 A1 | 12/2002 | Grinstein et al. | |
| 2005/0079878 A1* | 4/2005 | Smith ................. | G08G 1/0104 455/456.5 |
| 2008/0201100 A1 | 8/2008 | Petrov | |
| 2009/0005965 A1* | 1/2009 | Forstall et al. ............... | 701/201 |
| 2009/0138353 A1 | 5/2009 | Mendelson | |
| 2012/0084248 A1* | 4/2012 | Gavrilescu ........ | G06F 17/30867 706/52 |
| 2012/0116550 A1 | 5/2012 | Hoffman et al. | |
| 2012/0265433 A1* | 10/2012 | Viola et al. ................... | 701/410 |
| 2013/0053990 A1 | 2/2013 | Ackland | |
| 2013/0217979 A1 | 8/2013 | Blackadar et al. | |
| 2014/0058672 A1 | 2/2014 | Wansley et al. | |

(Continued)

FOREIGN PATENT DOCUMENTS

JP       2010-271189      12/2010
KR   10-2010-0064937       6/2010

OTHER PUBLICATIONS

International Search Report and Written Opinion in International Application No. PCT/US2014/045611, mailed Jun. 12, 2015, 12 pages.

(Continued)

*Primary Examiner* — Lester Kincaid
*Assistant Examiner* — Sayed T Zewari
(74) *Attorney, Agent, or Firm* — Fish & Richardson P.C.

(57) ABSTRACT

Techniques of determining a path using anonymous application usage data are described. A path determination system and method can determine a location and geometrical shape of a path based on anonymous application usage data received from one or more devices. The anonymous application usage data can include an identifier or a category of the application program executed by a device, and multiple locations of the device observed while the application program executes on the device. Based on the locations, the system and method can determine a path for associating with the application program. The system and method can use metadata of the application program for identifying the path in response to a query or a request. The system and method can provide the path to a device for display in an information layer on a virtual map.

28 Claims, 10 Drawing Sheets

(56) References Cited

U.S. PATENT DOCUMENTS

| | | |
|---|---|---|
| 2014/0200805 A1 | 7/2014 | Modica et al. |
| 2014/0350850 A1 | 11/2014 | Kmiecik et al. |
| 2015/0006255 A1 | 1/2015 | Schewel et al. |
| 2015/0256977 A1 | 9/2015 | Huang |

OTHER PUBLICATIONS

Brunsdon, Chris. "Path estimation from GPS tracks." In Proceedings of the 9th International Conference on GeoComputation, National Centre for Geocomputation, National University of Ireland, Maynooth, Eire. 2007. 9 pages.

\* cited by examiner

PATH DETERMINATION BASED ON APPLICATION USAGE

TECHNICAL FIELD

This disclosure relates generally to location-based services.

BACKGROUND

An online map service can provide virtual maps to one or more devices. The virtual maps can include streets, trails, and bus lines. Based on publicly available information, the online map service can determine, for example, that a segment of a street includes a bicycle lane, a trail in a park is designated as a hiking only trail or as a hiking and biking mixed-use trail. In response to a user provided filter (e.g., please highlight bike-friendly roads), the online map service can highlight only those streets that have bicycle lanes or trails open to bicycles on the virtual map.

SUMMARY

Techniques of determining a path using anonymous application usage data are described. A path determination system can determine a location and geometrical shape of a path based on anonymous application usage data received from one or more devices. The anonymous application usage data can include an identifier or a category of the application program executed by a device, and multiple locations of the device observed while the application program executes on the device. Based on the locations, the system can determine a path for associating with the application program. The system can use metadata of the application program for identifying the path in response to a query or a request. The system can provide the path to a device for display in an information layer on a virtual map.

The features described in this specification can be implemented to achieve one or more advantages. For example, a path location determination system using anonymous application usage data can provide information on how frequently a path is used. Publicly available information can be used to determine a nature of a road (e.g., whether the road has a bicycle lane), but is often insufficient for determining whether the road is frequently used or popular. The anonymous application usage data can be used to determine whether many users use the road, and at what time.

A path location determination system using anonymous application usage data can detect temporary road closures. For example, the system can determine that a pattern of using a path has changed. The system can determine that a path was frequently used, but for a length of time, no anonymous application usage data indicate that devices traveled to locations along that path. The system can determine that the path is at least temporarily closed. The system can provide this information to a user to supplement other information on road closures.

The system can determine which activity is popular for a path. For example, the system can determine that, during particular time (e.g., on weekdays), more application programs related to recording cycling activities than application programs related to recording hiking activities are executed on a path. The system can determine that, outside of the particular time (e.g., on weekends), the opposite is true. The system can then provide the path as a suggestion in response to a query on "hiking" during a weekday, and provide the path as a suggestion in response to a query on "biking" during a weekend day.

In addition to determining a path, the system can determine hours in which the path is frequently used. For example, the system can determine hours during which users visit hiking trails of a park. Based on the visiting hours, the system can determine hours during which the park is open to the public. The system can provide the open hours of a park or a hiking trail to a user as a user convenience feature.

The features described in this specification can be implemented to maximize privacy protection of users. In implementations where the operations are performed by a server, the server needs no more information from a device than an anonymous location and an identifier of the application program being launched. In particular, the server does not need and does not collect any user specific information.

The details of one or more implementations of path location determination based on anonymous application usage data are set forth in the accompanying drawings and the description below. Other features, aspects, and advantages of path location determination based on anonymous application usage data will become apparent from the description, the drawings, and the claims.

BRIEF DESCRIPTION OF THE DRAWINGS

Like reference symbols in the various drawings indicate like elements.

DETAILED DESCRIPTION

Exemplary User Interface

Figure 1:
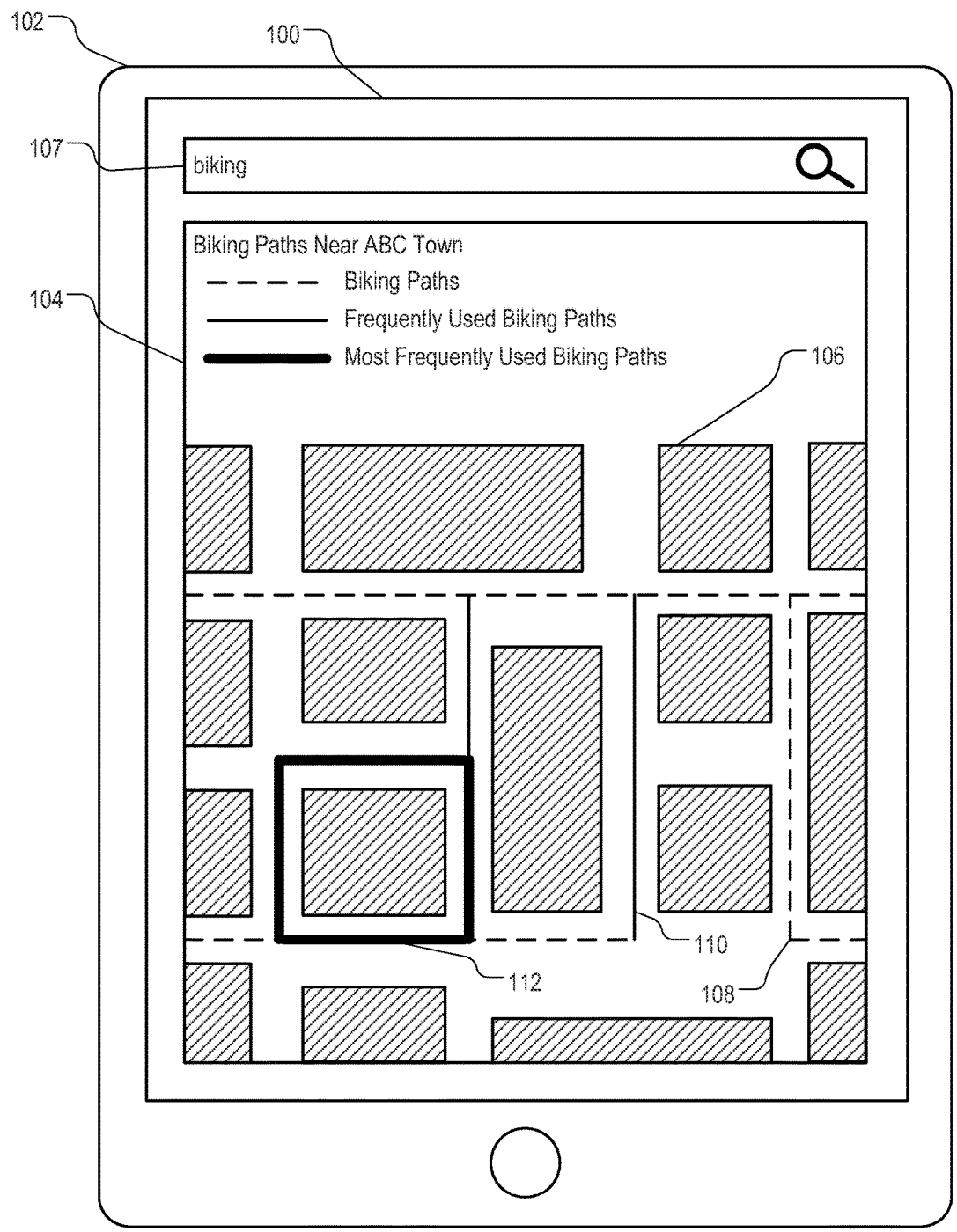
FIG. 1 illustrates an exemplary user interface displaying paths determined based on anonymous application usage data.

FIG. 1 illustrates an exemplary user interface displaying paths determined based on anonymous application usage data. User interface 100 can be displayed on device 102. User interface 100 can include virtual map 104. Map 104 can include one or more street blocks 106 (e.g., buildings) and one or more streets between the street blocks 106.

Device 102 can be a mobile device, e.g., a laptop or tablet computer, a smart phone, or a wearable electronic device.

While displaying map 104, device 102 can submit a request to a path determination system connected to device 102 (e.g., through a communications network). The request can include a query having a query term (e.g., "biking"). The query term can be provided by a user of device 102 in search box 107 of user interface 100. Upon receiving the request, the system can identify paths 108, 110, and 112 that are considered related to the query term. The system can provide coordinates of paths 108, 110, and 112 to device 102 for display. The coordinates can define locations and geometric shapes of paths 108, 110, and 112. Device 102 can display paths 108, 110, and 112 in an information layer overlaying on map 104.

Paths 108, 110, and 112 may or may not follow geographic features of map 104, e.g., going along one or more streets. For example, paths 108, 110, and 112 can be paths across a large plaza or a park, as defined by flows of people rather than defined by street names. Accordingly, paths 108, 110, and 112 can include a plaza that is not a street. In addition, paths 108, 110, and 112 may or may not include streets designated as being the particular type by publicly available information. For example, paths 108, 110, and 112 may or may not include streets having designated bicycle lanes or streets designated as bicycle and pedestrian only.

The system can determine that paths 108, 110, and 112 are relevant to the query term ("biking") based on its usage from one or more specific application programs across multiple devices. The system can determine that those one or more application programs are related to the query term. For example, a category (e.g., "health and fitness") of the one or more application programs may correlate to the query term "biking." The system can determine, from a path database, that paths 108, 110, and 112 are related to the one or more application programs, and are located within the portion of map 104 displayed on device 102. The system can then provide paths 108, 110, and 112 to device 102.

The system can determine location and shape of paths 108, 110, and 112 based on anonymous application usage data. The anonymous application usage data can include a series of application locations and a timestamp associated with each location. Many users may use the application program (e.g., "Bike Track") to record a user's workout route, for example, a series of locations for defining an exercise route and timestamps of the locations for determining a speed. The devices can upload the recorded data to the system as anonymous application usage data. Base on metadata of the application program, the system can determine that paths 108, 110, and 112 are associated with a type of movement (e.g., "biking" or "cycling") or a type of users (e.g., "cyclists"), and belong to a particular category (e.g., "fitness and health"). The system can use the type of movement, type of users, and category as bases for responding to the query.

By combining locations in the anonymous application usage data, the system can determine locations and shapes of paths 108, 110, and 112. Based on the number of devices submitting the anonymous application usage data, the system can determine the usage frequency of each of paths 108, 110, and 112. For example, the system can determine that path 108 is a path traveled by at least some users (e.g., more than a first threshold number of cyclists). The system can determine that path 110 is a path traveled by many users (e.g., more than a second threshold number of cyclists). The system can determine that path 112 is a path traveled by most users (e.g., more than a third threshold number of cyclists). The system can designate path 108 as a biking path, designate path 110 as a frequently used biking path, and path 112 as a most frequently used biking path.

The use frequency information of paths 108, 110, and 112, being determined using anonymous application usage data submitted by devices that moved along paths 108, 110, and 112, can include historical path usage data in addition to real time data. The use frequency information can include information that is more than traffic information on paths 108, 110, and 112. For example, the use frequency information can include information on how many times paths 108, 110, and 112 have been used in the last X months, in addition to how many people are using paths 108, 110, and 112 concurrently.

Paths 108, 110, and 112 can have different geometric shapes or use frequency according to different categories of applications that are related to the paths. For example, a second application program ("Jogging Track") may record locations and timestamps along paths 108, 110, and 112. Based on anonymous application usage data of the second application program, the system can associate paths 108, 110, and 112 with a second type of movement (e.g., "jogging"). Joggers and cyclists may follow different routes. Accordingly, when responding to a query having a term "jogging" instead of "biking," the system can determine paths 108, 110, and 112 based on application programs related to "jogging" instead of "biking." Paths 108, 110, and 112 related to "jogging" each can have a different geometric shape or use frequency designation than a corresponding path associated with "biking." A path frequently used for biking may or may not be used as frequently for hiking or jogging. Additional details on how the system determines paths 108, 110, and 112 are described below in reference to FIGS. 2-10.

Upon receiving paths 108, 110, and 112 from the system, device 102 can display paths 108, 110, and 112 in the information layer. Device 102 can display each of paths 108, 110, and 112 in a different legend (e.g., a different color, thickness, or both) to represent the differences in use frequency. Device 102 can supplement publicly available information (e.g., which street has a designated bicycle lane) using location, shape, and use frequency information of paths 108, 110, and 112.

Path Stitching

Figure 2:
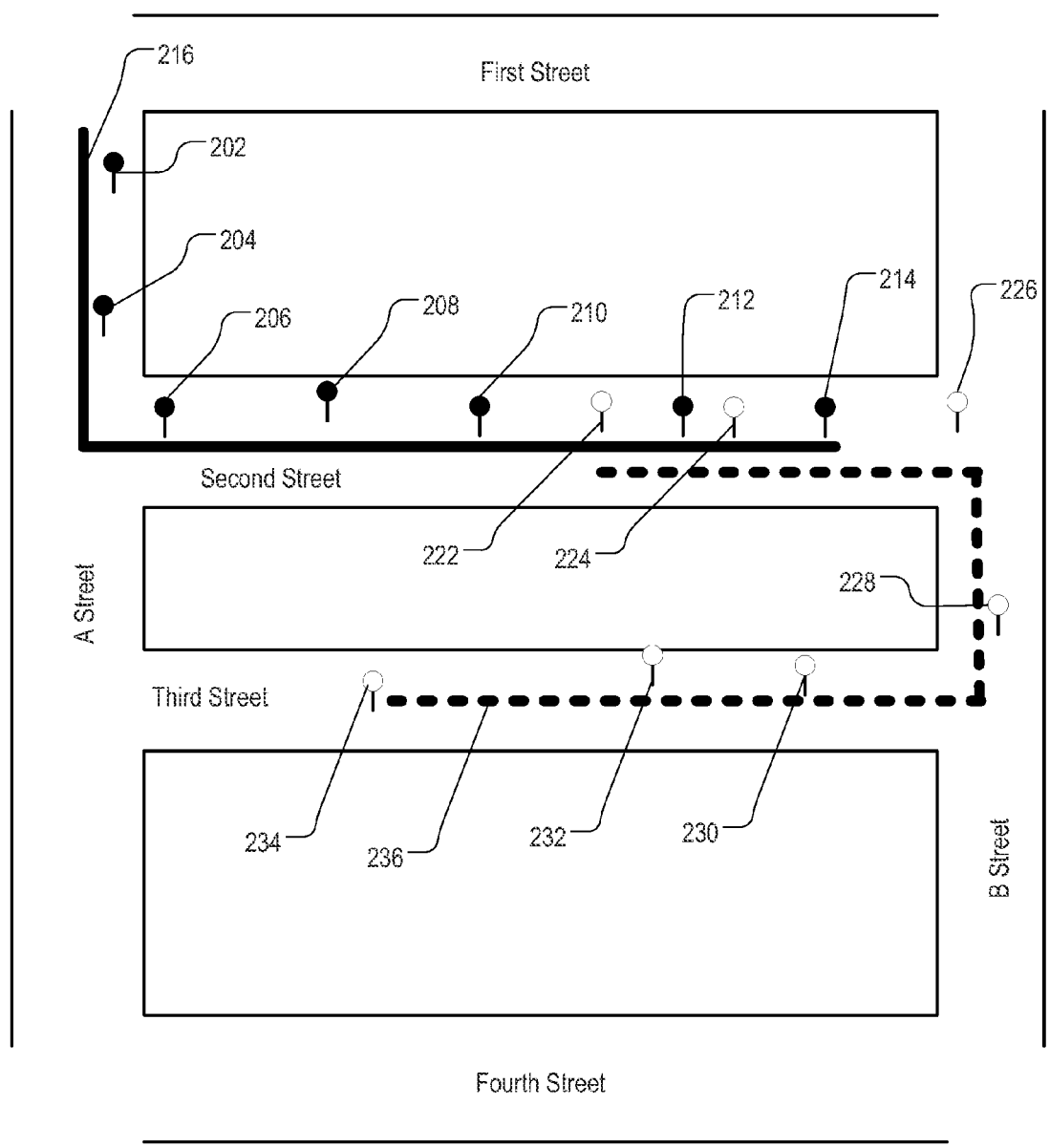
FIG. 2 is a diagram illustrating exemplary techniques of stitching segments of a path.

FIG. 2 is a diagram illustrating exemplary techniques of stitching two segments of a path. A path determination system can receive anonymous application usage data from a first device and a second device. The anonymous application usage data can include an identifier of an application program (e.g., a system identifier for application "Bike Track") executing or executed on the first and second devices. The anonymous application usage data can include device locations, e.g., a series of locations of each device while the device executes the application program.

For example, the system can receive device locations 202, 204, 206, 208, 210, 212, and 214 from the first device. The system can determine first path 216 based on the device locations. In some implementations, the system can snap first path 216 to geographic features of land. For example, the system can snap first path 216 along "A Street" and "Second Street" of a city. The system can receive device locations 222, 224, 226, 228, 230, 232, and 234 from the second device. The system can determine second path 236 based on the device locations. The system can snap second path 236 to city streets.

The system can determine that a portion of first path 216 and a portion of second path 236 overlap. For example, the system can determine a path segment between device location 214 and device location 222 is in both first path 216 and second path 236. In response, the system can stitch first path 216 and second path 236 to determine an integrated path between device location 202 and device location 234. The system can provide the integrated path for display as an information layer on a map, or provide the integrated path as a recommendation for users of application program "Bike Track."

Crowd Sourcing

Figure 3:
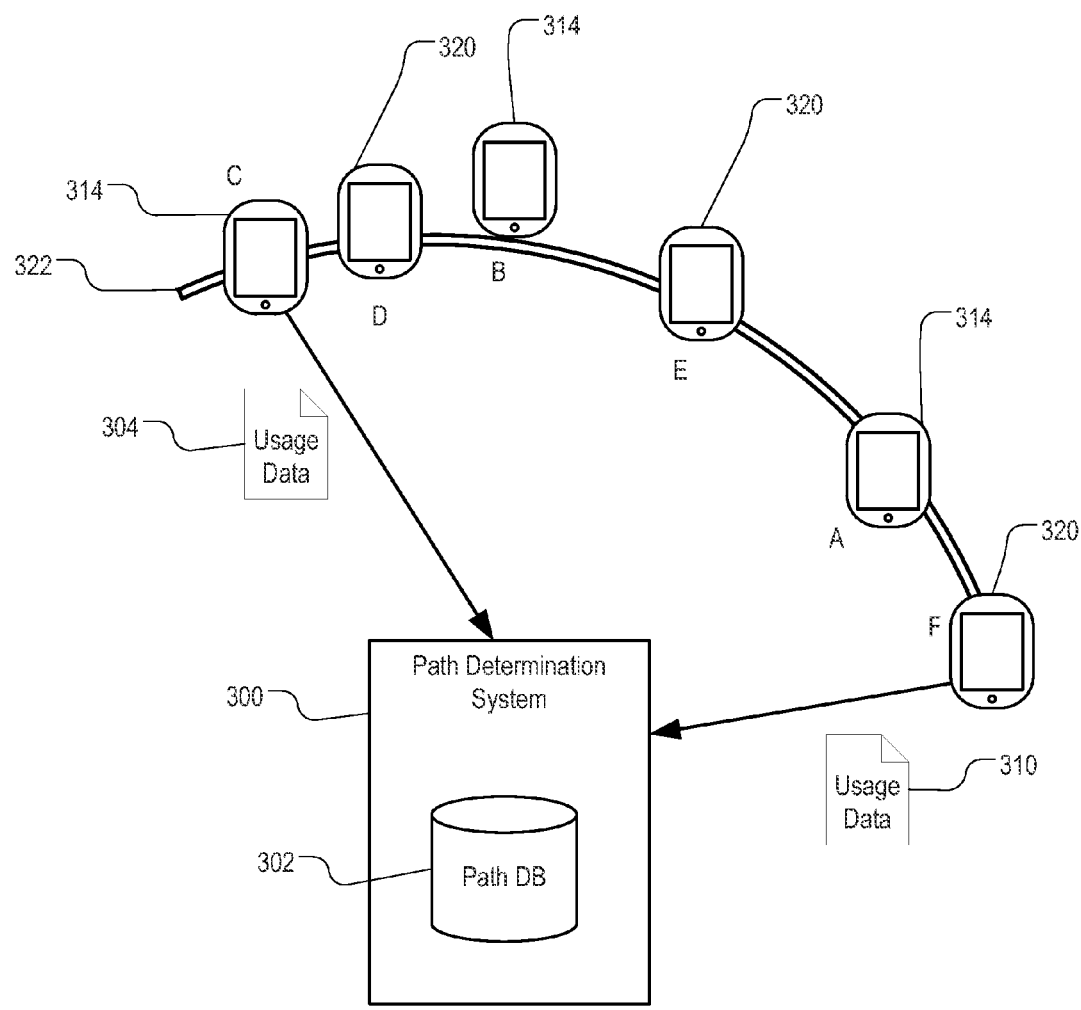
FIG. 3 is a diagram illustrating exemplary techniques of determining a path using crowd source data.

FIG. 3 is a diagram illustrating exemplary techniques of determining a path using crowd source data. Crowd source data can include anonymous application usage data receive by system 300 from multiple devices. System 300 is a path determination system as described above in reference to FIG. 1 and FIG. 2. System 300 can include path database 302. Path database 302 can store identifiers, locations, and geometries of paths. The identifiers can be associated with land features (e.g., street or trail names) or latitude and longitude coordinates. The paths in path database 302 can be associated with use frequency information. The use frequency information can indicate a number or a frequency of travels the occurred along a path over a given time period.

System 300 can receive anonymous application usage data 304 and 310 from devices 314 and 320, respectively. Anonymous application usage data 304 and 310 include anonymous information on application program execution on the respective device. Application programs executed on the devices can include an application program (e.g., "Bike Track") from an application provider. The application program, while executing on device 314 or 320, can use a location determination subsystem of the device (e.g., a global satellite navigation system receiver) to determine a series of locations. For example, device 314 can record locations A, B, and C. Device 314 can upload locations A, B, and C to system 300 in anonymous application usage data 304 while device 314 executes Bike Track or at a later time. Likewise, device 320 can record locations D, E, and F, and upload locations D, E, and F to system 300 in anonymous application usage data 310. Using locations A, B, C, D, E, and F, system 300 can determine path 322, on which both device 314 and device 320 travel.

In addition, based on multiple submissions of anonymous application usage data related to the application program Bike Track, system 300 can determine that Bike Track executions are concentrated in a time period (e.g., 10:00 am through 6:00 pm) on path 322 during weekends. System 300 can determine that, outside of the time period, Bike Track rarely executes on path 322. Upon making these observations, system 300 can determine that path 322 is not related to the application program Bike Track outside of the time period. Accordingly, system 300 can determine that use frequency of path 322 is time based. System 300 can store the time-based use frequency and the geometry in association with path 322 in path database 302.

Figure 4:
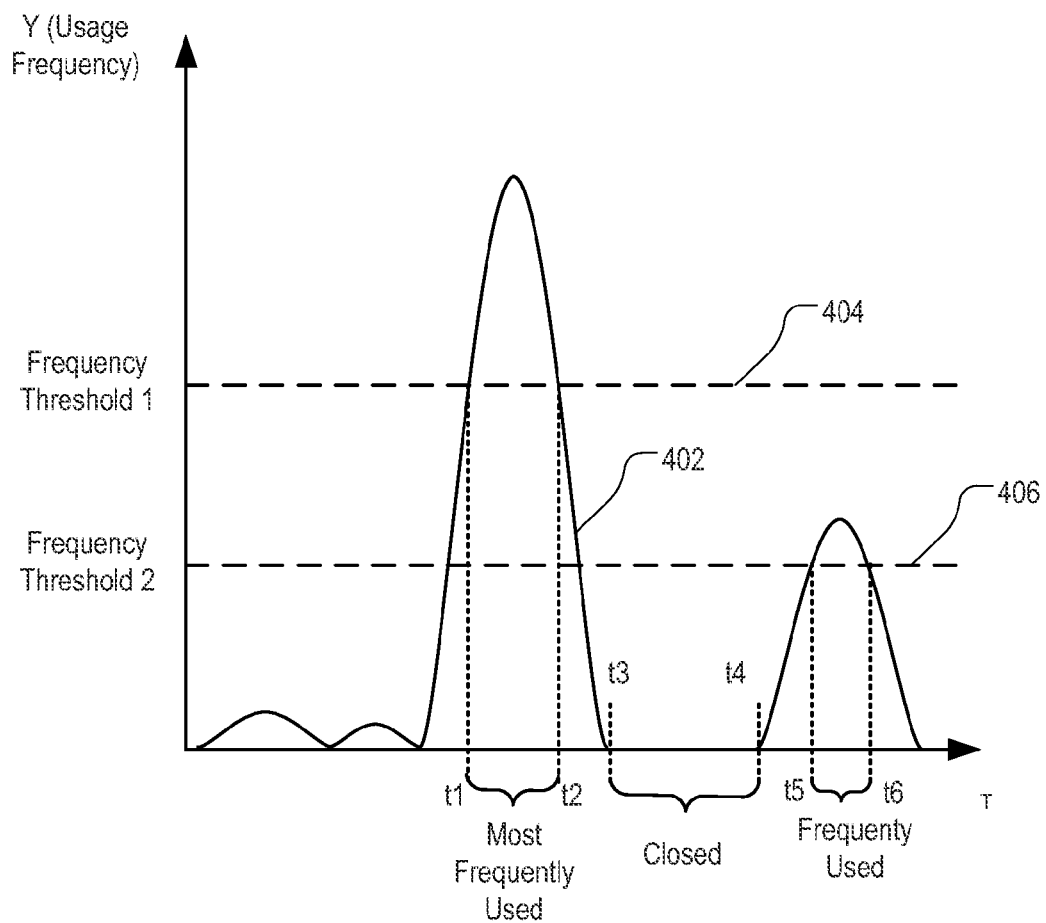
FIG. 4 is a diagram illustrating exemplary techniques of determining a time-based use frequency of a section of a path.

FIG. 4 is a diagram illustrating exemplary techniques of determining a time-based use frequency of a section of a path. System 300 (of FIG. 3) can determine a distribution of usage of an application program (e.g., Bike Track) over time T for each path (e.g., path 322 of FIG. 3).

A Y-axis in FIG. 4 represents a usage frequency. The usage frequency can be a number of application programs executing on a path at a given time per unit length of the path (e.g., per kilometer). System 300 can determine the usage frequency by counting a number of individual application programs executing at device locations along a path. Due to path stitching, different sections of a path may have a different usage frequency. Upon determining that a stitched section is sufficiently long (e.g., longer than a street block or longer than X meters), system 300 can calculate the usage frequency of the stitched section separately from other sections of a path. Usage frequency can vary through time, as represented in usage distribution 402.

System 300 can determine, based on the anonymous application usage data, that between time t1 and t2, the usage frequency of a path exceeds first frequency threshold 404. In response, system 300 can determine that between time t1 and t2, the path is a most frequently used path related to the application program. System 300 can determine that, between time t3 and t4, the usage frequency of the path is zero. In response, system 300 can determine that between time t3 and t4, the path is closed to users of the application program. System 300 can determine that, between time t5 and t6 (and shortly before t1 and shortly after t2), the usage frequency of a path does not reach first frequency threshold 404 but exceeds second frequency threshold 406. In response, system 300 can determine that between time t5 and t6, the path is a less frequently used path related to the application program than between time t1 and t2.

System 300 can determine frequency thresholds 404 and 406 based on usage frequency of multiple paths related to the application program. For example, system 300 can determine frequency threshold 404 based on top X percent (e.g., top 20%) usage frequencies from all segments and all paths related to the application program. System 300 can determine frequency threshold 404 based on top Y percent (e.g., top 50%) usage frequencies.

Figure 5:
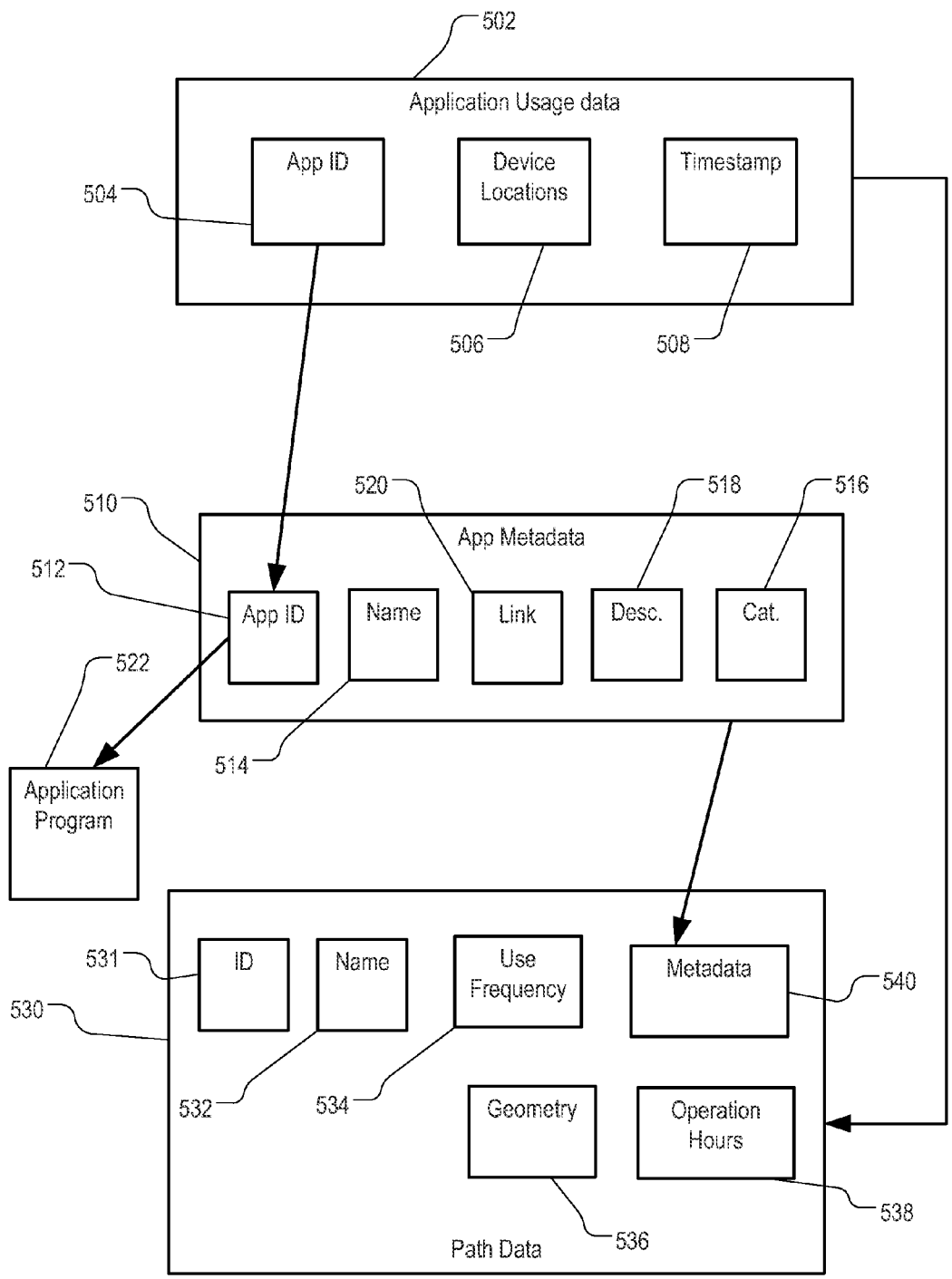
FIG. 5 is a block diagram illustrating exemplary relations between anonymous application usage data, application metadata, and path data.

FIG. 5 is a block diagram illustrating exemplary relations between anonymous application usage data, application metadata, and path data. Anonymous application usage data 502 can be data submitted by devices (e.g., devices 314 and 320 of FIG. 3) to a path determination system (e.g., system 300 of FIG. 3). Anonymous application usage data 502 can include application identifier 504, device locations 506, and timestamps 508. Application identifier 504 can be a system identifier of the application program executing on a device. Device locations 506 can include a series of geographic locations of the device at time of executing the application program. The geographic locations can each include latitude, longitude, and altitude coordinates. Timestamps 508 can include a time each device location is recorded.

System 300 can determine application metadata 510 based on application programs submitted to an application store by an application provider for distribution to the devices. Application metadata 510 can include application identifier 512, application name 514, application category 516, application description 518, and application link 520. Application identifier 512 can be an identifier of application program 522. Application name 514 can include a name (e.g., a display name) of application program 522. Application category 516 can include a category of application program 522 as provided by a provider of application program 522 (e.g., by uploading application program 522 into a category of an application store). Application description 518 can include a description of application program 522 (e.g., as submitted by a provider of application program 522 for approval of application program 522). Application link 520 can include a link (e.g., a web link to a web site).

System 300 can store path data 530. Path data 530 can include path identifier 531, path name 532, path use frequency 534, path geometry 536, path operation hours 538, and path metadata 540. Path identifier 531 can be a unique identifier for a path. Path name 532 can be shared by multiple paths. Path use frequency 534 can include time-based use frequency corresponding to a usage frequency of a path. Path geometry 536 can include multiple points on a path, each point having geographic coordinates. The points may or may not correspond to device locations submitted by devices. For example, in some implementations, the points may be points where a path changes direction. Path operation hours 538 can include one or more time periods that a path is open to people (e.g., park hours, or hours a street is designated as a pedestrian street). Path metadata 540 can include a representation of application metadata 510. For example, path metadata 540 can include a category (e.g., jogging trail, biking trail, or hiking trail) of a path. System 300 can use select a path in response to a query or request based on path metadata 540.

One entry of application metadata 510 can be associated with one or more entries of path data 530. For example, an entry in application metadata 510 for "Bike Track" can be associated with many biking trails or streets. One entry of path data 530 can be associated with one or more entries of application metadata 510. For example, an entry in path data 530 for a trail can have path metadata 540 that associated with multiple application programs related to cycling, jogging, or hiking.

Upon receiving anonymous application usage data 502 from devices, system 300 can determine path use frequency 534, path geometry 536, and path operation hours 538 of a path related to the application program based on device locations 506 and timestamps 508 of the received anonymous application usage data 502. When system 300 receives a query or a request for information, system 300 can determine that one or more paths are related to the query or are matches to the information requested based on path name 532 and path metadata 540. System 300 can filter the one or more paths using path geometry 536. For example, system 300 can exclude those paths that are far away from a location of a requesting device or from a location provided with the query or request. Additionally or alternatively, system 300 can filter the one or more paths using path operation hours 538. For example, system 300 can exclude those paths that are closed at time of the query or request. System 300 can provide different use frequency information at different time of the query or request according to time-based path use frequency 534.

Exemplary System Components

Figure 6:
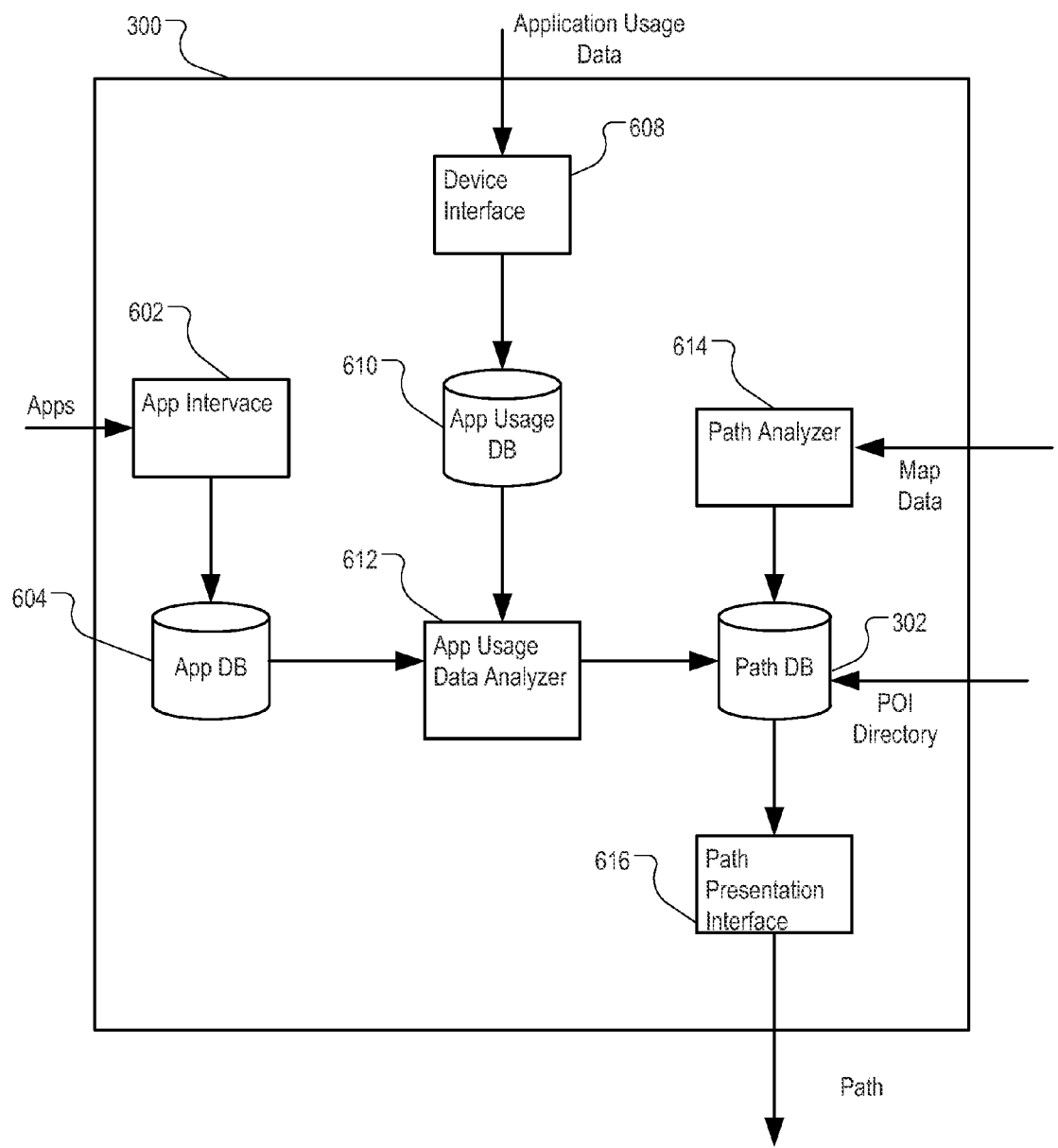
FIG. 6 is a block diagram illustrating exemplary components of a path determination system.

FIG. 6 is a block diagram illustrating exemplary components of path determination system 300. Each component of system 300 can include hardware and software (or firmware) components. System 300 can be implemented on a device, a server device coupled with a device, or both.

System 300 can include application interface 602. Application interface 602 is a component of system 300 configured to receive application programs, and associated application metadata, from application providers. Application interface 602 can store the received application programs and application metadata in application database 604.

System 300 can include device interface 608. Device interface 608 is a component of system 300 configured to receive anonymous application usage data from multiple devices, aggregate the received anonymous application usage data (e.g., by an application identifier, an application category, or both), and store the aggregated anonymous application usage data in anonymous application usage database 610.

System 300 can include anonymous application usage data analyzer 612. Anonymous application usage data analyzer 612 is a component of system 300 configured to read aggregated anonymous application usage data from anonymous application usage database 610. Anonymous application usage data analyzer 612 can create a new path in path database 302 if the anonymous application usage data indicate a path never before recorded. Otherwise, anonymous application usage data analyzer 612 can map the aggregated anonymous application usage data to a path already stored in path database 302 or stitch a path stored in path database 302. Anonymous application usage data analyzer 612 can determine location and geometry of the path. In addition, anonymous application usage data analyzer 612 can determine operation hours of the path and time-based use frequency of the path.

System 300 can include path analyzer 614. Path analyzer 614 is a component of system 300 configured to snap a path to a geographic feature using the geometry of a path (which includes latitude and longitude coordinates) and geographic data. For example, path analyzer 614 can straighten a zigzag path caused by a pedestrian walking around in a crowd to a straight line following a direction of a street. In some implementations, system 300 can determine that a section of a path is a two-dimensional area rather than a line. For example, system 300 can determine that from a point A and a point B on a path, device locations are spread wide (e.g., exceeding X meters). In response, system 300 can determine that the path is a geographic area between point A and point B. Accordingly, system 300 can capture places characterized by random (rather than linear) movement of people, e.g., a plaza or a large open lawn area in a park.

System 300 can include path presentation interface 616. Path presentation interface 616 is a component of system 300 configured to present a path, a use frequency of the path, and operation hours of the path to a device, for example, for display on a virtual map. Path presentation interface 616 can provide the location or operation hours in response to a search request from the device, or in response to a request to display an information layer of a virtual map.

Exemplary Procedures

Figure 7:
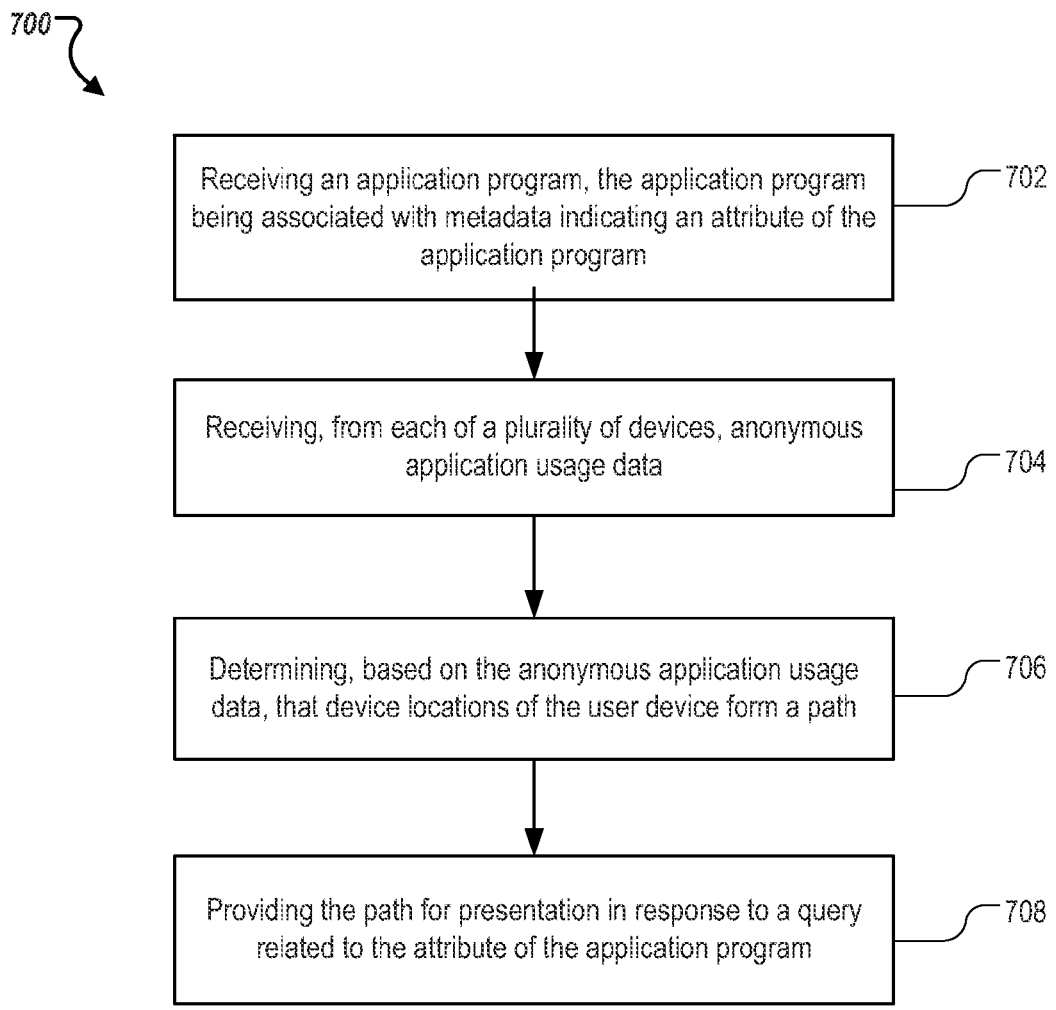
FIG. 7 is a flowchart illustrating an exemplary procedure of path determination based on application usage.

FIG. 7 is a flowchart illustrating exemplary procedure 700 of path determination based on application usage. Procedure 700 can be performed by a path determination system, e.g., system 300 of FIG. 6.

The system can receive (702), using application interface 602 of FIG. 6, an application program. The application program can be associated with metadata indicating an attribute of the application. The application program can be program submitted to an application store by an application provider for distribution to devices. The metadata can include at least one of an icon, a name, a description, a category, or a link.

The system can receive (704), using device interface 608 of FIG. 6 and from one or more devices, anonymous application usage data. The anonymous application usage data can indicate that the application program is executed on the device, and that while the application program is being executed, the device has traveled to multiple device locations. The device location can be a location of the respective device at time of executing the application program by the respective device. Each device location in the anonymous application usage data can be associated with a timestamp. The timestamp can indicate a time that the respective device is located at the corresponding device location.

The system can determine (706), using anonymous application usage data analyzer 612 of FIG. 6 and based on the anonymous application usage data, that device locations of each device form a path. Determining that device locations of the device form a path can include determining, based on map data, that each of the device locations is located on a route (e.g., a street or a trail) on the map. The system can designate a portion of the route where the device locations are located as the path.

In some implementations, the system can receive separate anonymous application usage data from another device. The anonymous application usage data from the other device can include one or more device locations located on a second portion of the route. The system can determine that the two portions of the route overlap. In response, the system can concatenate (e.g., stitch) the first portion and the second portion of the route, and designate the concatenated portions of the route as the path.

In some implementations, the system can determine that a number of application programs executing along the path satisfies a use frequency threshold value during a time period. In response, the system can designate the path as a frequently used path. The system can provide the frequently used path for presentation in response to a request for path recommendation. A path can include multiple segments. Each segment can have a different use frequency designation. A segment of a path can be a two-dimensional area.

The system can provide (708), using path presentation interface 616 of FIG. 6, the path for presentation in response to a query related to the attribute of the application program. Providing the path for presentation can include providing the path for display in an information layer of a map. The information layer can include geographic information related to the metadata of the application program (e.g., a category "health and fitness"). Providing the path for presentation can include determining, based on the metadata, that the application program is related to the query (e.g., "biking"). The system can determine that the path is located proximate to a query location. The query location can be a location associated with the query (e.g., a location where the query is issued, or a location specified by the query). The system can then provide the path for display overlaying on a map. The path can be displayed using emphasis (e.g., different color or size) to represent various use frequencies.

In some implementations, the system can determine a most frequently performed activity (e.g., "biking") for a path based on the anonymous application usage data, for example, upon determining that an application program (e.g., "Bike Track") executes most frequently on the path compared to other application programs (e.g., "Hike Track" or "Jogging Track"). The system can then provide the path as a recommendation in response to a search on the activity. The recommendation can be time-based. For example, the system can recommend a trail for biking on a given day or season and during given hours, and recommend the trail for hiking at other time.

Exemplary Mobile Device Architecture

Figure 8:
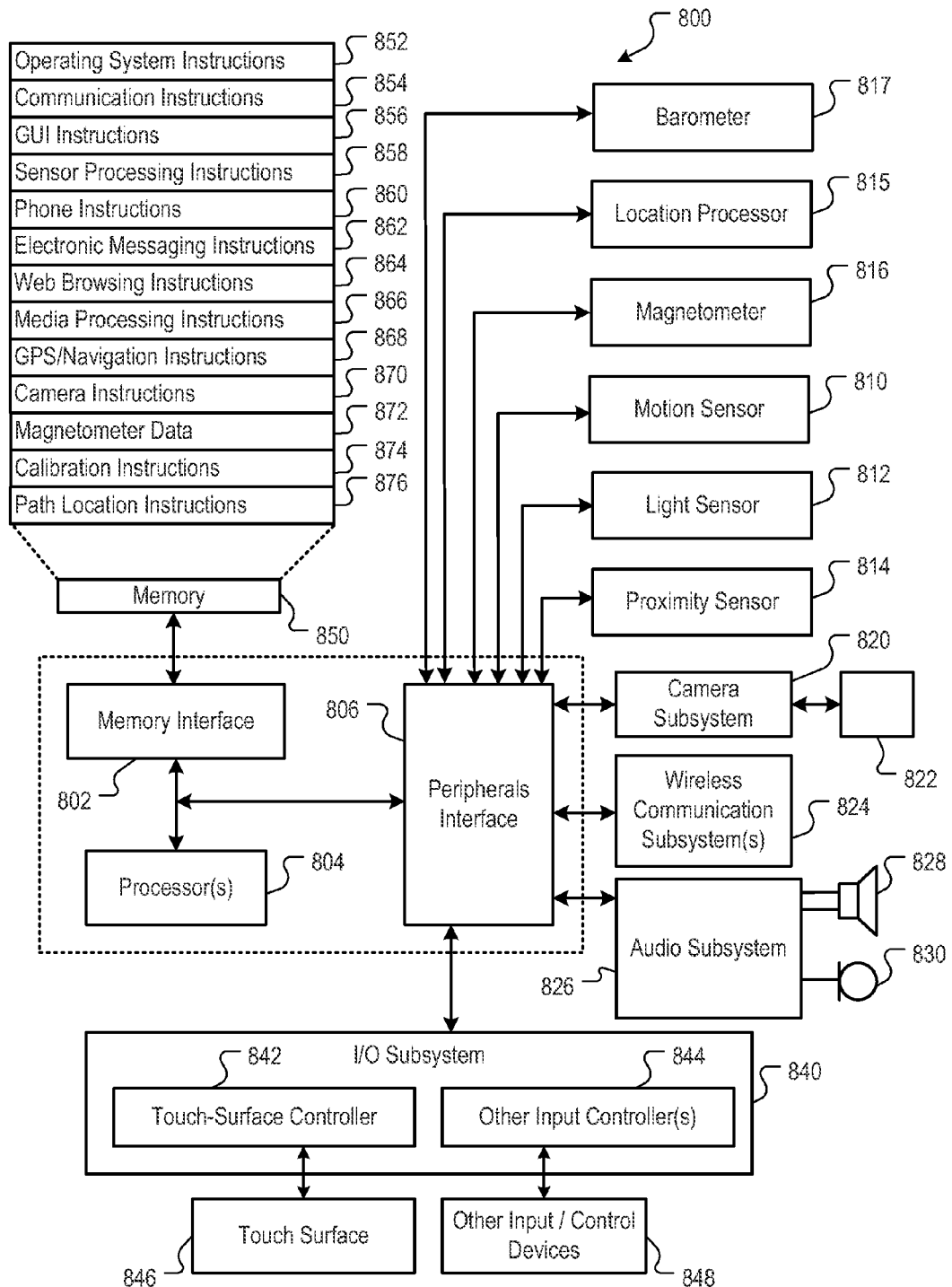
FIG. 8 is a block diagram illustrating an exemplary device architecture of a mobile device implementing the features and operations of FIGS. 1-7.

FIG. 8 is a block diagram illustrating exemplary device architecture 800 of a mobile device implementing the features and operations of FIGS. 1-7. A mobile device (e.g., device 314 or 320 as described in reference to FIG. 3) can include memory interface 802, one or more data processors, image processors and/or processors 804, and peripherals interface 806. Memory interface 802, one or more processors 804 and/or peripherals interface 806 can be separate components or can be integrated in one or more integrated circuits. Processors 804 can include application processors, baseband processors, and wireless processors. The various components in the mobile device, for example, can be coupled by one or more communication buses or signal lines.

Sensors, devices, and subsystems can be coupled to peripherals interface 806 to facilitate multiple functionalities. For example, motion sensor 810, light sensor 812, and proximity sensor 814 can be coupled to peripherals interface 806 to facilitate orientation, lighting, and proximity functions of the mobile device. Location processor 815 (e.g., GPS receiver) can be connected to peripherals interface 806 to provide geopositioning. Electronic magnetometer 816 (e.g., an integrated circuit chip) can also be connected to peripherals interface 806 to provide data that can be used to determine the direction of magnetic North. Thus, electronic magnetometer 816 can be used as an electronic compass. Motion sensor 810 can include one or more accelerometers configured to determine change of speed and direction of movement of the mobile device. Barometer 817 can include one or more devices connected to peripherals interface 806 and configured to measure pressure of atmosphere around the mobile device.

Camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which a mobile device is intended to operate. For example, a mobile device can include communication subsystems 824 designed to operate over a GSM network, a GPRS network, an EDGE network, a Wi-Fi™ or WiMAX™ network, and a Bluetooth™ network. In particular, the wireless communication subsystems 824 can include hosting protocols such that the mobile device can be configured as a base station for other wireless devices.

Audio subsystem 826 can be coupled to a speaker 828 and a microphone 830 to facilitate voice-enabled functions, such as voice recognition, voice replication, digital recording, and telephony functions. Audio subsystem 826 can be configured to receive voice commands from the user.

I/O subsystem 840 can include touch surface controller 842 and/or other input controller(s) 844. Touch surface controller 842 can be coupled to a touch surface 846 or pad. Touch surface 846 and touch surface controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch surface 846. Touch surface 846 can include, for example, a touch screen.

Other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of speaker 828 and/or microphone 830.

In one implementation, a pressing of the button for a first duration may disengage a lock of the touch surface 846; and a pressing of the button for a second duration that is longer than the first duration may turn power to the mobile device on or off. The user may be able to customize a functionality of one or more of the buttons. The touch surface 846 can, for example, also be used to implement virtual or soft buttons and/or a keyboard.

In some implementations, a mobile device can present recorded audio and/or video files, such as MP3, AAC, and MPEG files. In some implementations, the mobile device can include the functionality of an MP3 player. The mobile device may, therefore, include a pin connector that is compatible with the iPod. Other input/output and control devices can also be used.

Memory interface 802 can be coupled to memory 850. Memory 850 can include high-speed random access memory and/or non-volatile memory, such as one or more magnetic disk storage devices, one or more optical storage devices, and/or flash memory (e.g., NAND, NOR). Memory 850 can store operating system 852, such as Darwin, RTXC, LINUX, UNIX, OS X, WINDOWS, iOS, or an embedded operating system such as VxWorks. Operating system 852 may include instructions for handling basic system services and for performing hardware dependent tasks. In some implementations, operating system 852 can include a kernel (e.g., UNIX kernel).

Memory 850 may also store communication instructions 854 to facilitate communicating with one or more additional devices, one or more computers and/or one or more servers. Memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; magnetometer data 872 and calibration instructions 874 to facilitate magnetometer calibration. The memory 850 may also store other software instructions (not shown), such as security instructions, web video instructions to facilitate web video-related processes and functions, and/or web shopping instructions to facilitate web shopping-related processes and functions. In some implementations, the media processing instructions 866 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 850. Memory 850 can store path location instructions 876. Path location instructions 876, upon execution, can cause processor 804 to collect anonymous application usage data including multiple device locations and associated timestamps, and to submit anonymous application usage data to a path determination system.

Each of the above identified instructions and applications can correspond to a set of instructions for performing one or more functions described above. These instructions need not be implemented as separate software programs, procedures, or modules. Memory 850 can include additional instructions or fewer instructions. Furthermore, various functions of the mobile device may be implemented in hardware and/or in software, including in one or more signal processing and/or application specific integrated circuits.

Exemplary Operating Environment

Figure 9:
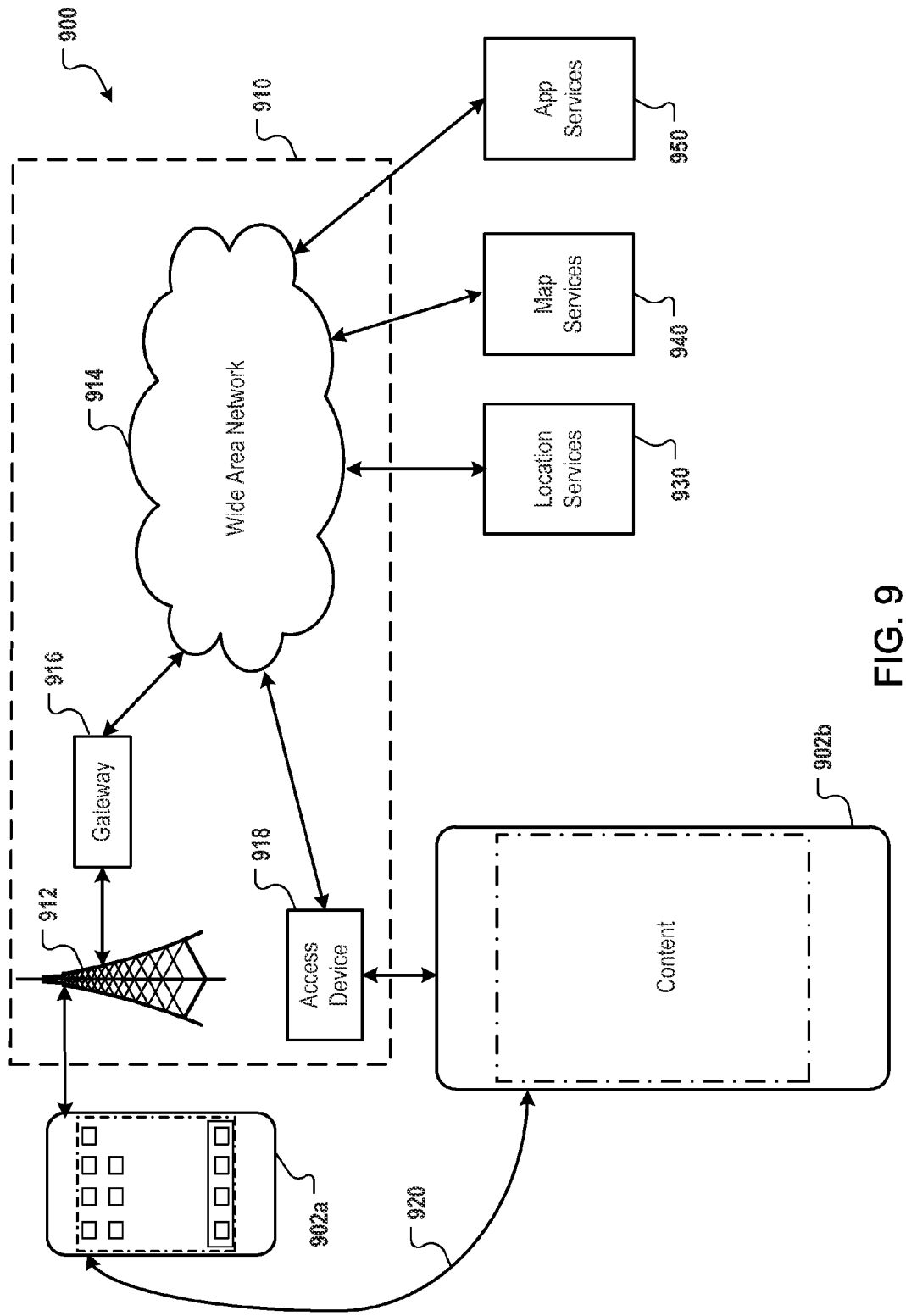
FIG. 9 is a block diagram of an exemplary network operating environment for the mobile devices implementing the features and operations of FIGS. 1-7.

FIG. 9 is a block diagram of exemplary network operating environment 900 for the mobile devices implementing the features and operations of FIGS. 1-7. Each of mobile device 902*a* and mobile device 902*b* can be device 314 or 320 as described in reference to FIG. 3. Mobile devices 902*a* and 902*b* can, for example, communicate over one or more wired and/or wireless networks 910 in data communication. For example, a wireless network 912, e.g., a cellular network, can communicate with a wide area network (WAN) 914, such as the Internet, by use of a gateway 916. Likewise, an access device 918, such as an 802.11g wireless access point, can provide communication access to the wide area network 914. Each of mobile devices 902*a* and 902*b* can be a device as described in FIGS. 1-7.

In some implementations, both voice and data communications can be established over wireless network 912 and the access device 918. For example, mobile device 902*a* can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 912, gateway 916, and wide area network 914 (e.g., using Transmission Control Protocol/Internet Protocol (TCP/IP) or User Datagram Protocol (UDP)). Likewise, in some implementations, the mobile device 902*b* can place and receive phone calls, send and receive e-mail messages, and retrieve electronic documents over the access device 918 and the wide area network 914. In some implementations, mobile device 902*a* or 902*b* can be physically connected to the access device 918 using one or more cables and the access device 918 can be a personal computer. In this configuration, mobile device 902*a* or 902*b* can be referred to as a "tethered" device.

Mobile devices 902*a* and 902*b* can also establish communications by other means. For example, wireless device 902*a* can communicate with other wireless devices, e.g., other mobile devices, cell phones, etc., over the wireless network 912. Likewise, mobile devices 902*a* and 902*b* can establish peer-to-peer communications 920, e.g., a personal area network, by use of one or more communication subsystems, such as the Bluetooth™ communication devices. Other communication protocols and topologies can also be implemented.

Mobile device 902*a* or 902*b* can, for example, communicate with one or more services 930, 940, and 950 over the one or more wired and/or wireless networks. For example, one or more location services 930 can provide names and locations of streets or trails. Map services 940 can provide a virtual map for display. The virtual map can include the streets or trails. Application service 950 can provide application programs for download. The application programs can each be used to determine one or more paths.

Mobile device 902*a* or 902*b* can also access other data and content over the one or more wired and/or wireless networks. For example, content publishers, such as news sites, Really Simple Syndication (RSS) feeds, web sites, blogs, social networking sites, developer networks, etc., can be accessed by mobile device 902a or 902b. Such access can be provided by invocation of a web browsing function or application (e.g., a browser) in response to a user touching, for example, a Web object.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, application identifier, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

Exemplary System Architecture

Figure 10:
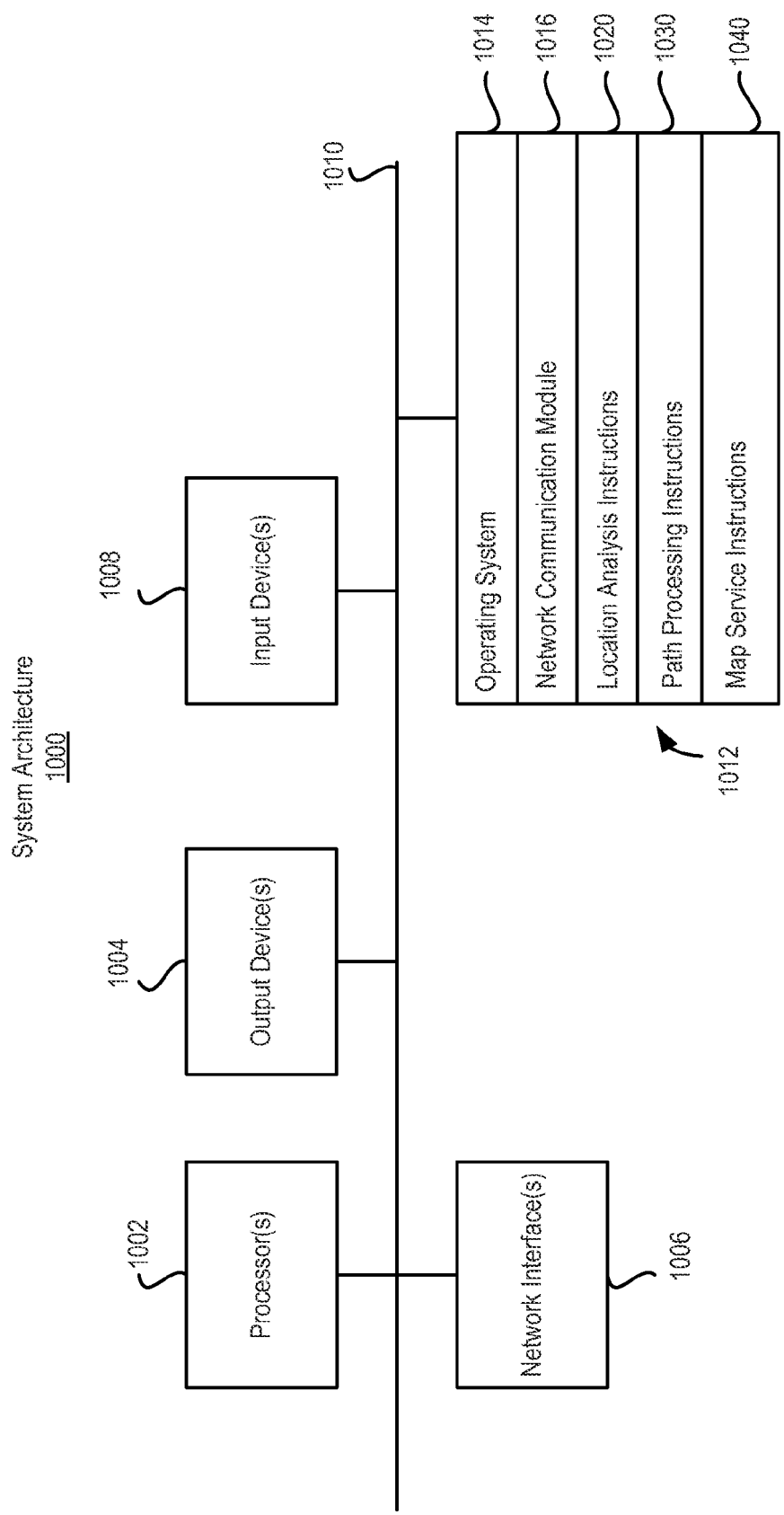
FIG. 10 is a block diagram of an exemplary system architecture for implementing the features and operations of FIGS. 1-7.

FIG. 10 is a block diagram of exemplary system architecture 1000 for implementing the features and operations of FIGS. 1-7. Other architectures are possible, including architectures with more or fewer components. System architecture 1000 can be implemented by server 102 of FIG. 1. In some implementations, architecture 1000 includes one or more processors 1002 (e.g., dual-core Intel® Xeon® Processors), one or more output devices 1004 (e.g., LCD), one or more network interfaces 1006, one or more input devices 1008 (e.g., mouse, keyboard, touch-sensitive display) and one or more computer-readable mediums 1012 (e.g., RAM, ROM, SDRAM, hard disk, optical disk, flash memory, etc.). These components can exchange communications and data over one or more communication channels 1010 (e.g., buses), which can utilize various hardware and software for facilitating the transfer of data and control signals between components.

The term "computer-readable medium" refers to any medium that participates in providing instructions to processor 1002 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 1012 can further include operating system 1014 (e.g., Mac OS® server, Windows Server®, or iOS®), network communication module 1016, location analysis instructions 1020, path processing instructions 1030, and map service instructions 1040. Operating system 1014 can be multi-user, multiprocessing, multitasking, multithreading, real time, etc. Operating system 1014 performs basic tasks, including but not limited to: recognizing input from and providing output to devices 1006, 1008; keeping track and managing files and directories on computer-readable mediums 1012 (e.g., memory or a storage device); controlling peripheral devices; and managing traffic on the one or more communication channels 1010. Network communications module 1016 includes various components for establishing and maintaining network connections (e.g., software for implementing communication protocols, such as TCP/IP, HTTP, etc.). Location analysis instructions 1020 can include instructions that, when executed, causes processor 1002 to perform operations of anonymous application usage data analyzer 612 as described above in reference to FIG. 6, including determining geometry, use frequency, and open hours of one or more paths. Pass processing instructions 1030 can include instructions that, when executed, causes processor 1002 to perform operations of anonymous application usage data analyzer 612, including snapping a path to a geographic feature and stitching segments of a path. Map service instructions 1040 can include instructions that, when executed, causes processor 1002 to provide map information to devices. The map information can path location and shape, path use frequency, and path hours as determined based on anonymous application usage data.

Architecture 1000 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations of the invention have been described. Nevertheless, it will be understood that various modifications can be made without departing from the spirit and scope of the invention.

What is claimed is:

1. A method comprising:
   receiving, from a plurality of mobile devices, a plurality of device locations;
   correlating the device locations with application usage on the mobile devices;
   determining a path defined by the device locations;
   determining that the application usage and the correlated locations indicate that a first activity and a second activity are performed on the path;
   determining, based on the application usage, that the first activity is performed on the path more often than the second activity is performed on the path;
   associating the first activity with the path;
   receiving a query directed at the first activity; and
   providing the path for presentation in response to the query,
   wherein the method is performed by one or more computing devices.

2. The method of claim 1, wherein:
   the application usage includes a frequency an application program is executed at the device locations;
   the application program is a program submitted to an application store by an application provider for distribution to one or more mobile devices; and
   the application program is associated with metadata, the metadata includes at least one of a name, a description, an application category, the name, description or application category corresponding to the first activity or the second activity.

3. The method of claim 2, wherein associating the first activity with the path comprises:
   determining, based on the application usage, that the application program is associated with the first activity;
   determining, based on the application usage, that, during a first time period, the application program is launched more often than another application program that is associated with the second activity; and
   associating the path with the first activity for the first time period.

4. The method of claim 3, further comprising:
   determining, based on the application usage, that the other application program is launched more often than the first application program during the second time period; and
   associating the path with the second application program for the second time period.

5. The method of claim 1, comprising:
   providing the path for presentation in response to a request for path recommendation, the request being specified in the query.

6. The method of claim 1, wherein providing the path for presentation comprises providing the path for display in an information layer of a map, the information layer being associated with time periods.

7. The method of claim 6, wherein providing the path for presentation comprises:
   determining a time period associated with the query; and
   providing the path for display overlaying on a map, wherein determining that the first activity is performed on the path more often than the second activity is performed on the path is based on the time period.

8. The method of claim 1, wherein the path includes a plurality segments, each segment having a different use frequency designation, at least one segments of the path is a two-dimensional area.

9. The method of claim 1, wherein:
   the application usage includes at least one of a name or type of an application program,
   the activity includes at least one of hiking or biking, and
   the method comprises indicating that the path is suitable for the first activity at given time, and suitable for the second activity at other time.

10. A system comprising:
    one or more computing devices; and
    a non-transitory storage device storing computer instructions operable to cause the one or more computing device to perform operations comprising:
    receiving, from a plurality of mobile devices, a plurality of device locations;
    correlating the device locations with application usage on the mobile devices;

determining a path defined by the device locations;
determining that the application usage and the correlated locations indicate that a first activity and a second activity are performed on the path;
determining, based on the application usage, that the first activity is performed on the path more often than the second activity is performed on the path;
associating the first activity with the path;
receiving a query directed at the first activity; and
providing the path for presentation in response to the query.

11. The system of claim 10, wherein:
the application usage includes a frequency an application program is executed at the device locations;
the application program is a program submitted to an application store by an application provider for distribution to one or more mobile devices; and
the application program is associated with metadata, the metadata includes at least one of a name, a description, an application category, each of the name, description or application category corresponding to the first activity or the second activity.

12. The system of claim 11, wherein associating the first activity with the path comprises:
determining, based on the application usage, that the application program is associated with the first activity;
determining, based on the application usage, that, during a first time period, the application program is launched more often than another application program that is associated with the second activity; and
associating the path with the first activity for the first time period.

13. The system of claim 12, the operations further comprising:
determining, based on the application usage, that the other application program is launched more often than the first application program during the second time period; and
associating the path with the second application program for the second time period.

14. The system of claim 10, the operations comprising:
providing the path for presentation in response to a request for path recommendation, the request being specified in the query.

15. The system of claim 10, wherein providing the path for presentation comprises providing the path for display in an information layer of a map, the information layer being associated with time periods.

16. The system of claim 15, wherein providing the path for presentation comprises:
determining a time period associated with the query; and
providing the path for display overlaying on a map, wherein determining that the first activity is performed on the path more often than the second activity is performed on the path is based on the time period.

17. The system of claim 10, wherein the path includes a plurality segments, each segment having a different use frequency designation, at least one segments of the path is a two-dimensional area.

18. The system of claim 10, wherein:
the application usage includes at least one of a name or type of an application program, and
the operations comprise indicating that the path is suitable for the first activity at given time, and suitable for the second activity at other time.

19. A non-transitory storage device storing computer instructions operable to cause one or more computing device to perform operations comprising:
receiving, from a mobile device, a plurality of device locations;
correlating the device locations with application usage on the mobile device;
determining a path defined by the device locations;
determining that the application usage and the correlated locations indicate that a first activity and a second activity are performed on the path;
determining, based on the application usage, that the first activity is performed on the path more often than the second activity is performed on the path;
associating the first activity with the path;
receiving a query directed at the first activity; and
providing the path for presentation in response to the query.

20. The non-transitory storage device of claim 19, wherein:
the application usage includes a frequency an application program is executed at the device locations;
the application program is a program submitted to an application store by an application provider for distribution to one or more mobile devices; and
the application program is associated with metadata, the metadata includes at least one of a name, a description, an application category, each of the name, description or application category corresponding to the first activity or the second activity.

21. The non-transitory storage device of claim 20, wherein associating the first activity with the path comprises:
determining, based on application usage, that the application program is associated with the first activity;
determining, based on the application usage, that, during a first time period, the application program is launched more often than another application program that is associated with the second activity; and
associating the path with the first activity for the first time period.

22. The non-transitory storage device of claim 21, the operations further comprising:
determining, based on the application usage, that the other application program is launched more often than the first application program during the second time period; and
associating the path with the second application program for the second time period.

23. The non-transitory storage device of claim 19, the operations comprising:
providing the path for presentation in response to a request for path recommendation, the request being specified in the query.

24. The non-transitory storage device of claim 19, wherein providing the path for presentation comprises providing the path for display in an information layer of a map, the information layer being associated with time periods.

25. The non-transitory storage device of claim 24, wherein providing the path for presentation comprises:
determining a time period associated with the query; and
providing the path for display overlaying on a map, wherein determining that the first activity is performed on the path more often than the second activity is performed on the path is based on the time period.

26. The non-transitory storage device of claim 19, wherein the path includes a plurality segments, each segment having a different use frequency designation, at least one segments of the path is a two-dimensional area.

27. The non-transitory storage device of claim 19, wherein:
the application usage includes at least one of a name or type of an application program, and
the operations comprise indicating that the path is suitable for the first activity at given time, and suitable for the second activity at other time.

28. A method comprising:
receiving, from a plurality of mobile devices, a plurality of device locations;
correlating the device locations with application usage on the mobile devices;
determining a path defined by the device locations;
determining a type of movement;
based on the type of movement, determining an activity that has been performed on the path;
associating the activity with the path;
receiving a query directed at the activity; and
providing the path for presentation in response to the query,
wherein the method is performed by one or more computing devices.

* * * * *